United States Patent
Xiao et al.

(10) Patent No.: US 12,541,862 B2
(45) Date of Patent: Feb. 3, 2026

(54) RENDERING AUGMENTED REALITY VIDEO USING FILTERED POINT-TO-POINT IMAGE MATCHES TO COMPUTE PERSPECTIVE-N-POINT CAMERA POSES

(71) Applicant: Adobe Inc., San Jose, CA (US)

(72) Inventors: Chang Xiao, Sunnyvale, CA (US); Ryan Rossi, Santa Clara, CA (US); Enyu Cai, West Lafayette, IN (US)

(73) Assignee: Adobe Inc., San Jose, CA (US)

( * ) Notice: Subject to any disclaimer, the term of this patent is extended or adjusted under 35 U.S.C. 154(b) by 438 days.

(21) Appl. No.: 18/084,606

(22) Filed: Dec. 20, 2022

(65) Prior Publication Data
US 2024/0202940 A1   Jun. 20, 2024

(51) Int. Cl.
*G06T 7/246* (2017.01)
*G06T 7/215* (2017.01)
(Continued)

(52) U.S. Cl.
CPC ............. *G06T 7/248* (2017.01); *G06T 7/215* (2017.01); *G06T 7/246* (2017.01); *G06T 7/74* (2017.01);
(Continued)

(58) Field of Classification Search
CPC ............. G06T 2207/30244; G06T 7/73; G06T 19/006; G06T 7/70; G06T 2207/20081;
(Continued)

(56) References Cited

U.S. PATENT DOCUMENTS

2021/0019215 A1*  1/2021  Neeter ............. G06Q 10/06316
2021/0134007 A1*  5/2021  Ahmed .................. G06V 20/00
(Continued)

FOREIGN PATENT DOCUMENTS

CN      110738143 A  *  1/2020  ............. G06F 16/29
CN      111882589 A  *  11/2020
(Continued)

OTHER PUBLICATIONS

Lu et al., A Review of Solutions for Perspective-n-Point Problem in Camera Pose Estimation, IOP Conf. Series: Journal of Physics: Conf. Series, 2018, vol. 1087, pp. 1-8, (2018) 052009, doi :10.1088/1742-6596/1087/5/052009.*

(Continued)

*Primary Examiner* — Guillermo M Rivera-Martinez
(74) *Attorney, Agent, or Firm* — Kilpatrick Townsned & Stockton LLP (57) ABSTRACT

Certain aspects and features of this disclosure relate to providing a hybrid approach for camera pose estimation using a deep learning-based image matcher and a match refinement procedure. The image matcher takes an image pair as an input and estimates coarse point-to-point feature matches between the two images. The coarse point-to-point feature matches can be filtered based on a stability threshold to produce high-stability point-to-point matches. A perspective-n-point (PnP) camera pose for each frame of video, including one or more added digital visual elements can be computed using the high-stability matches and video frames can be rendered, each using its computed camera pose.

20 Claims, 7 Drawing Sheets

(51) Int. Cl.
*G06T 7/73* (2017.01)
*G06T 15/20* (2011.01)

(52) U.S. Cl.
CPC .. *G06T 15/205* (2013.01); *G06T 2207/10016* (2013.01); *G06T 2207/20081* (2013.01); *G06T 2207/20084* (2013.01); *G06T 2207/30244* (2013.01); *G06T 2210/56* (2013.01)

(58) Field of Classification Search
CPC . G06T 2207/20084; G06T 2207/10028; G06T 2207/10016; G06T 7/00; G06V 20/20; G06V 10/757; G06V 10/82; G06V 20/40; G06V 10/443; G06V 10/44; G06V 10/20
See application file for complete search history.

(56) References Cited

U.S. PATENT DOCUMENTS

| | | | | |
|---|---|---|---|---|
| 2021/0174539 | A1* | 6/2021 | Duong | G06N 5/01 |
| 2022/0030214 | A1* | 1/2022 | Sinharoy | H04N 13/194 |
| 2023/0126366 | A1* | 4/2023 | Liao | G06T 7/593 |
| | | | | 382/103 |

FOREIGN PATENT DOCUMENTS

| | | | | |
|---|---|---|---|---|
| CN | 112053447 A | * | 12/2020 | G06T 7/246 |
| CN | 113902910 A | * | 1/2022 | G06F 18/214 |

OTHER PUBLICATIONS

Yu et al., A consistently fast and accurate algorithm for estimating camera pose from point correspondences, 2021, Measurement 172 (2021) 108914, pp. 1-9, doi.org/10.1016/j.measurement.2020.108914.*

Chen et al., EPro-PnP: Generalized End-to-End Probabilistic Perspective-n-Points for Monocular Object Pose Estimation, 2022, Computer Vision and Pattern Recognition, arXiv:2203.13254, pp. 2781-2790, doi.org/10.48550/arXiv.2203.13254.*

Bing et al., Web Page Segmentation with Structured Prediction and Its Application in Web Page Classification, Proceedings of the 37th International AACM SIGIR Conference on Research & Development in Information Retrieval, Jul. 2014, pp. 767-776.

Cai et al., Extracting Content Structure for Web Pages based on Visual Representation, Lecture Notes in Computer Science, vol. 2642, Available Online at: https://www.researchgate.net/publication/221239815_Extracting_Content_Structure_for_Web_Pages_Based_on_Visual_Representation, Apr. 2003, pp. 406-417.

Cao et al., A Segmentation Method for Web Page Analysis Using Shrinking and Dividing International Journal of Parallel, Emergent and Distributed Systems, vol. 25, No. 2, Apr. 2010, pp. 93-104.

Hout et al., LogoMotive: Detecting Logos on Websites to Identify Online Scams—A TLD Case Study, International Conference on Passive and Active Network Measurement, Mar. 2022, 12 pages.

Huang et al., LayoutLMv3: Pre-training for Document AI with Unified Text and Image Masking, Available Online at: https://arxiv.org/pdf/2204.08387.pdf, Jul. 19, 2022, 10 pages.

Khandelwal et al., Phishing Detection Using Computer Vision, Computer Networks and Inventive Communication Technologies, vol. 75, Sep. 14, 2021, pp. 113-130.

Li et al., Page Segmentation Using Convolutional Neural Network and Graphical Model, Lecture Notes in Computer Science, vol. 12116, Aug. 14, 2020, pp. 231-245.

Lin et al., Phishpedia: A Hybrid Deep Learning Based Approach to Visually Identify Phishing Webpages, USENIX Association, Aug. 11-13, 2021, pp. 3793-3810.

Manabe et al., Extracting Logical Hierarchical Structure of HTML Documents Based on Headings, Proceedings of the VLDB Endowment, vol. 8, No. 12, Aug. 1, 2015, pp. 1606-1617.

Pnueli et al., Web Page Layout Via Visual Segmentation, LABS hp, Available online at https://www.hpl.hp.com/techreports/2009/HPL-2009-160.pdf, Jul. 21, 2009, 5 pages.

Vargas, Web Page Segmentation, Evaluation and Applications, Ph. D. Dissertation. Université Pierre et Marie Curie-Paris VI, Jan. 2015, 143 pages.

Wang et al., WebFormer: The Web-page Transformer for Structure Information Extraction, Proceedings of the ACM Web Conference 2022, Association for Computing Machinery, Feb. 1, 2022, 10 pages.

* cited by examiner

RENDERING AUGMENTED REALITY VIDEO USING FILTERED POINT-TO-POINT IMAGE MATCHES TO COMPUTE PERSPECTIVE-N-POINT CAMERA POSES

TECHNICAL FIELD

The present disclosure generally relates to producing augmented reality images. More specifically, but not by way of limitation, the present disclosure relates to programmatic techniques for camera tracking with respect to such images.

BACKGROUND

Augmented reality (AR) provides an enhanced version of the real physical world that is achieved through the use of digital visual elements superimposed or inserted into photographic images or video of a real physical environment. The generation of AR images can include establishing a camera pose with respect to any digital visual elements in the AR image. The camera pose in this context includes the combination of the camera's position and orientation. In order for an AR image to possess an appropriate level of visual saliency and realism, the camera pose should be determined so as to make digital elements appear naturally positioned relative the content of the image on which the digital visual elements are superimposed. If video images are being used, the camera pose should change over time so that the camera's view of digital visual objects tracks with the natural movement of the real objects in the image. Various programmatic techniques can be used to control camera tracking in AR video imagery.

SUMMARY

Certain aspects and features of the present disclosure relate to rendering images using feature detection for image-based augmented reality. For example, a method involves accessing a template image and a content image for a frame of video including at least one digital visual element, and estimating coarse point-to-point feature matches between the template image and the content image for the current frame in part using a trained, convolutional, graph neural network. The method also involves filtering the coarse point-to-point feature matches based on a stability threshold to produce high-stability point-to-point matches. The method further involves computing, based on the high-stability point-to-point matches, a perspective-n-point (PnP) camera pose for the frame including the digital visual element. The method additionally involves rendering the frame of video with the digital visual element(s) using the PnP camera pose, as well as processing and rendering additional frames as needed to provide an AR video stream.

Other embodiments include corresponding computer systems, apparatus, and computer programs recorded on one or more computer storage devices, each configured to perform the actions of a method.

This summary is not intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim.

BRIEF DESCRIPTION OF THE DRAWINGS

Features, embodiments, and advantages of the present disclosure are better understood when the following Detailed Description is read with reference to the accompanying drawings, where.

DETAILED DESCRIPTION

Smooth, realistic camera tracking for AR imaging can be important in producing video imagery where the camera's view of digitally generated objects tracks with the natural movement of the real objects in the image as well as the point of view of the user. The generation of AR video images includes establishing a camera pose with respect to any digital visual elements in the video frames. The camera pose ideally is determined so as to make digital elements appear naturally positioned relative the content of the image frames in which the digital visual elements appear.

In some applications, marker-based tracking is used. Marker-based tracking methods require visual markers arranged at a pre-known layout on a flat surface (e.g., displayed on a monitor or printed on a paper). When the camera observes these markers, the camera pose can be estimated using the detected corner points of the markers. This method provides a fast and stable solution for camera pose tracking. However, it requires the markers to be placed in advance, for each scene, sometimes by the user, which increases the user's setup time. The markers also take up valuable screen space and as a result can make for a less natural-feeling AR experience.

Markerless techniques for camera tracking do not require the effort of placing markers. These methods, as an example, use scale-invariant feature transform (SIFT) techniques to estimate camera pose based on the natural visual features of captured images. Although such techniques eliminate scene markers, the detection of natural features is programmatically complex and error prone, resulting in low camera stability. Such stability problems manifest in AR video as jerky movements and corrections. These occurrences can be reduced by repeated and time-consuming scans of the AR environment to obtain robust visual features, but this again adds setup time and adversely impacts the user experience.

Embodiments described herein address the above issues by providing a hybrid approach for camera pose estimation using a deep learning-based image matcher and a match refinement procedure. The image matcher takes an image pair as an input and estimates point-to-point coarse matches. The coarse matches are refined by a refinement procedure, which can optionally match information from previous frames in a time sequence. A final camera pose is generated by perspective-n-point (PnP) pose computation with random sample consensus on refined matches. For an AR application that works with a web site, a neural network model can be trained or retrained using a dataset from the web site for better matching performance.

For example, an AR imaging application such as a shopping application for mobile devices can include a pretrained neural network model and a collection of template images that include items for purchase. The neural network can be trained in advance and deployed as part of the imaging application. A mobile computing device with the application installed can be invoked to use AR to visualize an available item in a specific environment, for example, a room in a home. The camera of the mobile computing device can be used to capture the actual physical room. The mobile computing device is moved around the environment and rotated through various angles and directions, with respect to where the camera is pointed. For each frame of video, the mobile computing device accesses a stored template image and a content image from the camera and estimates matches between the images using the trained neural network The matches are then filtered down to those matches, which have the highest stability as determined by a preset threshold. A camera pose is computed using the stable matches. Frames with both the captured images and the item for purchase can be rendered to provide an AR video experience. Each frame is rendered accurately using this technique, and optionally, information on matches in the prior frame, efficiently producing smooth, visually pleasing camera tracking without markers.

In some examples, the AR imaging application accesses a template image and a content image of a current frame of video including at least one digital visual element and estimates coarse point-to-point feature matches between the template image and the content image using a trained, convolutional, graph neural network. The AR imaging application filters the coarse point-to-point feature matches based on a stability threshold to produce high-stability point-to-point matches and computes a perspective-n-point (PnP) camera pose for the current frame including the digital visual element(s). The camera pose is based on the high-stability point-to-point matches. The AR imaging application can then render the current frame of video with the at least one digital visual element using the camera pose and proceed to repeat the process for the next frame in the video stream.

In some examples, the stability threshold is a specified number of frames or a duration of video over which a point-to-point match persists. In some examples, stability can be further improved by using the matching information from a prior frame of video produce a mask for screen segmentation of the current frame. The mask can be padded with added pixels to compensate for movement between the current frame and the prior frame. In some examples, the camera pose is computed by producing a point cloud using the prior frame and the current frame.

In some examples, the neural network model can be pretrained using a dataset of target images, for example, images of web pages, such as where the AR application is used to facilitate shopping or other applications that involve accessing or handling images from a web site. A random homography can be applied to each of the target images in the dataset to produce a ground truth for each of the target images. The ground truth is used to train a convolutional neural network to produce the trained, convolutional, graph neural network to be deployed with the AR application. If a companion web site that supplies data to the app supplies the target images, some target images can subsequently be used as template images during point matching. The use of a pretrained model deployed to a user computing device and a robust, programmatic technique for leveraging the model to calculate camera poses produces smooth, salient camera tracking that is effective in many applications.

Figure 1:
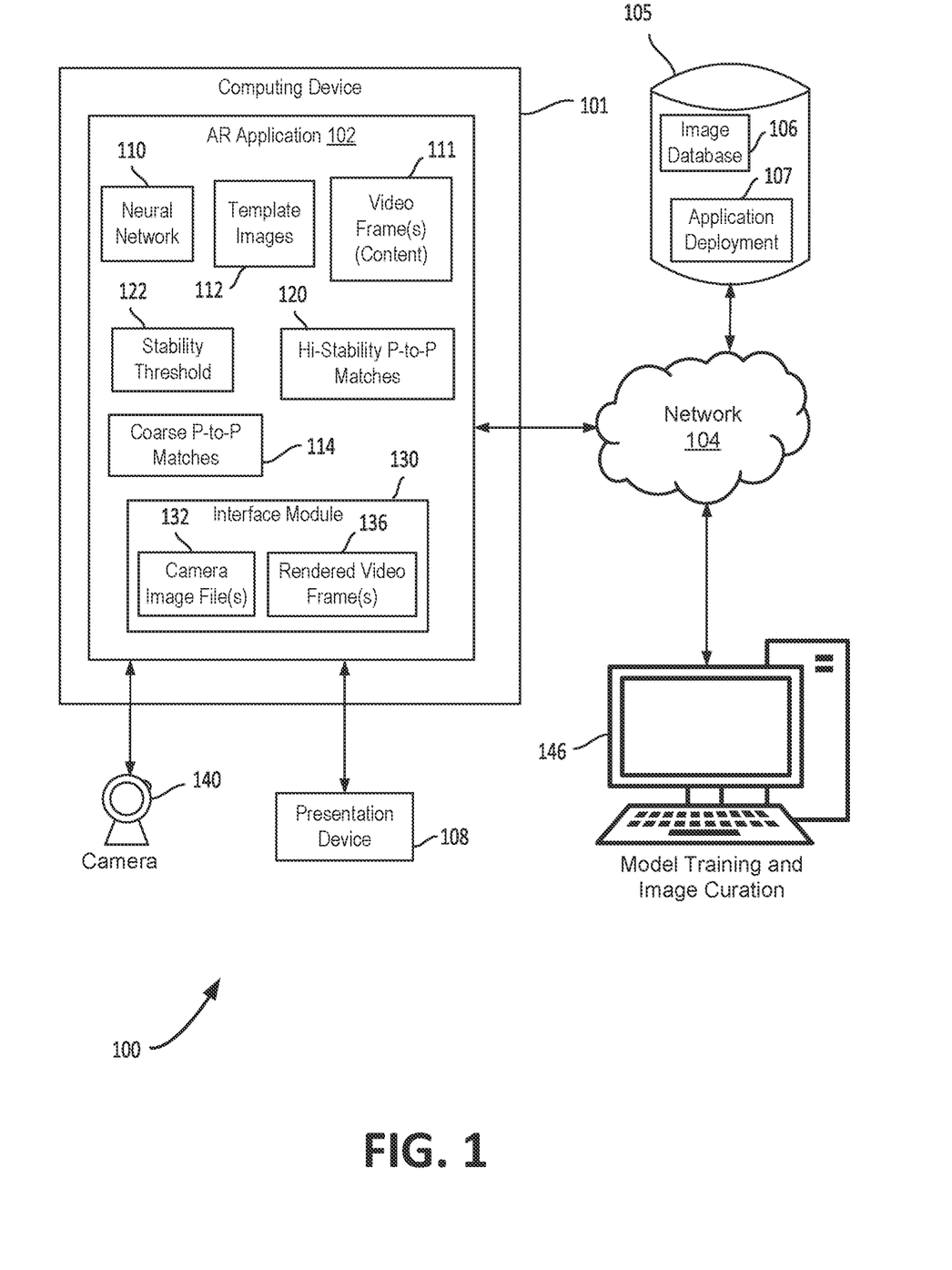
FIG. 1 is a diagram showing an example of a computing environment that uses feature detection for AR according to certain embodiments.

FIG. 1 is a diagram showing an example 100 of a computing environment that uses robust feature detection for AR according to certain embodiments. The computing environment 100 includes a computing device 101 that executes an AR application 102, a memory device 105, and a presentation device 108 that is controlled based on the AR application 102. The memory device 105 is communicatively coupled to computing device 101 using network 104. Memory device 105 is configured to store images 106 for use as target images for training as well as to be deployed to the computing device as template images 112 for image matching. An application deployment module 107 provides updated copies of the application with the trained model and template images to computing devices such as computing device 101. In this example, the AR application 102 includes the currently trained, convolutional, graph neural network 110, video frames 111 that are currently being processed and used as content images, and template images 112 that are currently in use.

Still referring to FIG. 1, coarse point-to-point feature matches 114 made between a content image from a video frame and a template image 112 are stored and filtered by AR application 102. The filter applies a preset stability threshold 122. The stability threshold can be based on a specified number of frames of video, or a duration of video (e.g., seconds) over which the point-to-point match persists. A match that exceeds the threshold is stored as a high-stability point-to-point match 120. The threshold can be a value that is hard coded in the sense that is only updated if it is changes as part of a new version of the application deployed by deployment module 107. Alternatively, the value can be set as part of a settings menu accessible within AR application 102.

In the example of FIG. 1, AR application 102 also includes an interface module 130. In some embodiments, the AR application 102 uses input from a camera 140 to capture camera image files 132 through interface module 130. The AR application 102 renders video frames 136 to be displayed on presentation device 108, which in the case of a mobile computing device may be a touch screen display that also received user input. While a mobile computing device is used herein as an example, embodiments as described herein can be implemented on many kinds of computing devices.

In addition to computing device 101, computing environment 100 including computing device 146, which in this example is a desktop computer or workstation. Computing device 146 is connected to network 104. Computing device 146 provides application development and deployment, neural network training, and image curation to support the AR application. The training of the neural network model is described in more detail below with respect to FIG. 4 and FIG. 5. Either or both of computing device 101 and computing device 146 can be implemented as either real or virtual (e.g., cloud-based) computing devices and can be implemented on any number of computing platforms, including but not limited to tablets, smartphones, workstations, desktops, or servers.

Figure 2:
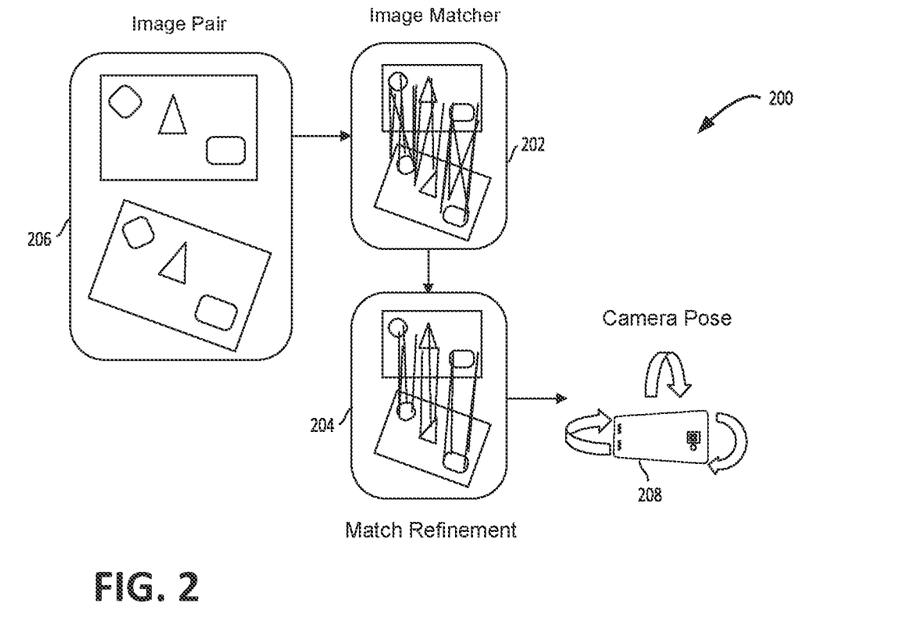
FIG. 2 is an example of a data flow that illustrates uses feature detection for AR according to certain embodiments.

FIG. 2 is an example of a data flow 200 that illustrates robust feature detection for AR according to certain embodiments. FIG. 2 illustrates a hybrid approach for camera pose estimation. The data flow includes a deep learning-based image matcher 202 and a match refinement procedure 204.

The image matcher 202 takes a grayscale image pair 206 as an input and estimates point-to-point coarse matches. The coarse matches are refined by the refinement procedure 204, which in this example uses matching information from previous frame(s) in the time sequence. The final camera pose 208 is generated by perspective-n-point (PnP) pose computation with random sample consensus on refined matches. The deep learning-based image matching model can be trained and retrained using a website dataset for better matching performance. The refinement process improves image matching accuracy by focusing on the matches that are the most stable over time. Points that are matched correspond to features within the images, for example, corners of objects, visual intersections of parts of objects, etc.

The robust feature detection provided by data flow 200 results in smooth camera tracking, with little jitter and few jumps in the position of digital visual elements within an environmental stream of video frames. The embodiments presented herein allow for precise, visually pleasing AR on computing devices without special hardware such as a LiDAR sensor or a camera with multiple lenses. A basic smartphone with only a single lens camera can be used effectively. And tracking effectiveness is improved even on an advanced smartphone with a LiDAR depth sensor.

Figure 3:
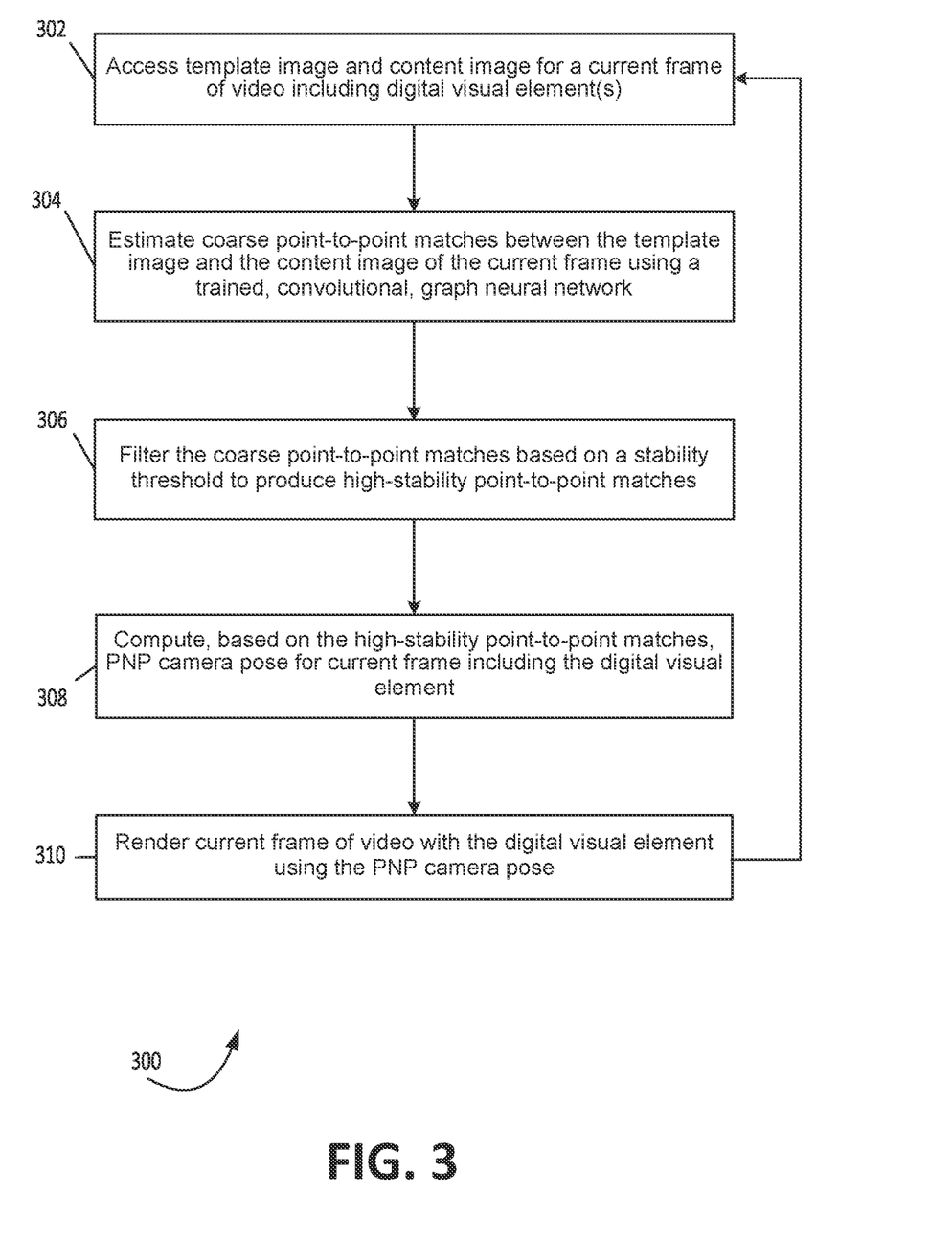
FIG. 3 is a flowchart of an example of a process for uses feature detection for AR according to some embodiments.

FIG. 3 is a flowchart of an example of a process 300 for robust feature detection for AR according to some embodiments. In this example, a computing device carries out the process by executing suitable program code, for example, computer program code for an application, such as AR application 102. At block 302, the computing device accesses a template image and a content image for the current frame of video. The template image is an image captured from a document or a monitor, and stored on a user's computing device, perhaps as part of an AR application. The content image is what the camera in the user's computing device is currently capturing to produce the real-time AR video stream. The images are treated as a pair with similar content, although the content does not need to be identical. This frame of video includes one or more digital visual elements superimposed within an environment. A digital visual element as described herein may be a graphically generated object or it may be sourced from a photograph that is different from the photograph of the environment. For example, for a shopping application, the digital visual element may be sourced from photographs of an article to be purchased.

At block 304, the computing device estimates course point-to-point matches between the template image and the content image of the current frame using a trained, convolutional, graph neural network. The initial image matching consists of two parts: a feature point detector with descriptor; and a matching approach that can receive the input from the feature detector with a description. A deep learning-based feature detector and descriptor can be used. A fully convolutional neural network architecture can operate on full-sized images and produce interest point detections accompanied by fixed-length descriptors in one pass. Such a machine-learning model can include a single, shared encoder that reduces image dimensionality. The architecture can also include multiple decoder heads that learn task-specific weights for the matching points and descriptions and these heads can share network parameters. Such a convolutional neural network in this example outputs a SIFT-like feature point location and descriptor, but with faster inference time and more feature points.

Continuing with FIG. 3, at block 306, the computing device filters the course point-to-point matches based on a stability threshold to produce high-stability point-to-point matches. At block 308, the computing device computes a PnP camera pose for the current frame. In some examples, the current frame includes one or more of the digital visual elements incorporated into an image of the physical environment where the user computing device is present. A block 310, the computing device renders the current frame of video with the digital visual element using the PnP camera pose. Process 300 proceeds back to block 302 to process additional frames as needed.

Figure 4:
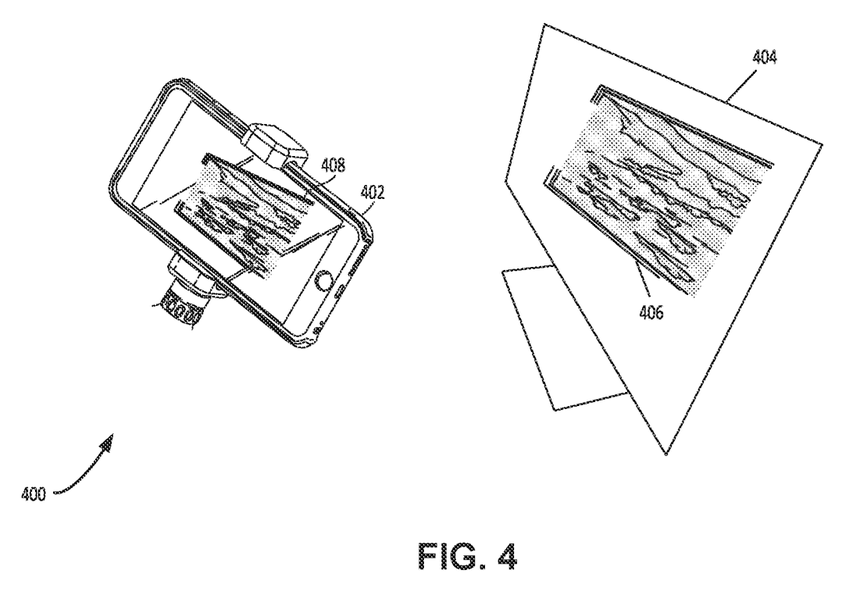
FIG. 4 is an example of a setup for training a neural network for use in feature detection according to certain embodiments.

FIG. 4 is an example 400 of a setup for training a neural network for use in robust feature detection according to certain embodiments. In this example, a convolutional neural network is combined with a graph neural network that simultaneously performs context aggregation and matching of local features. The resulting matching pairs that can then be refined by filtering.

The neural network can be trained for deployment by using a dataset containing web page screen shot images including depictions of the visual elements that are to be added into environmental images for AR video presentations. These screen shots can be captured by a camera such as the camera in mobile device 402 of FIG. 4, from a display such as display 404. This neural network, once trained, can serve as a neural network model of the expected data for AR presentations and can produce the AR images efficiently, with lower runtime requirements than existing marker-based or markerless AR techniques.

In one example, embodiments described herein reduced both translational and rotational errors in matches as compared to either a markerless system or a marker-based system using a SIFT technique. As a further performance comparison, the embodiments described herein achieved processing times of around 80 ms per frame whereas the SIFT technique exhibits processing times of around 1200 ms per frame. Screen segmentation can be used to separate a region of interest such as region 406, which appears as region 408 on mobile device 402, and will be discussed in further detail below with respect to FIG. 6.

Figure 5:
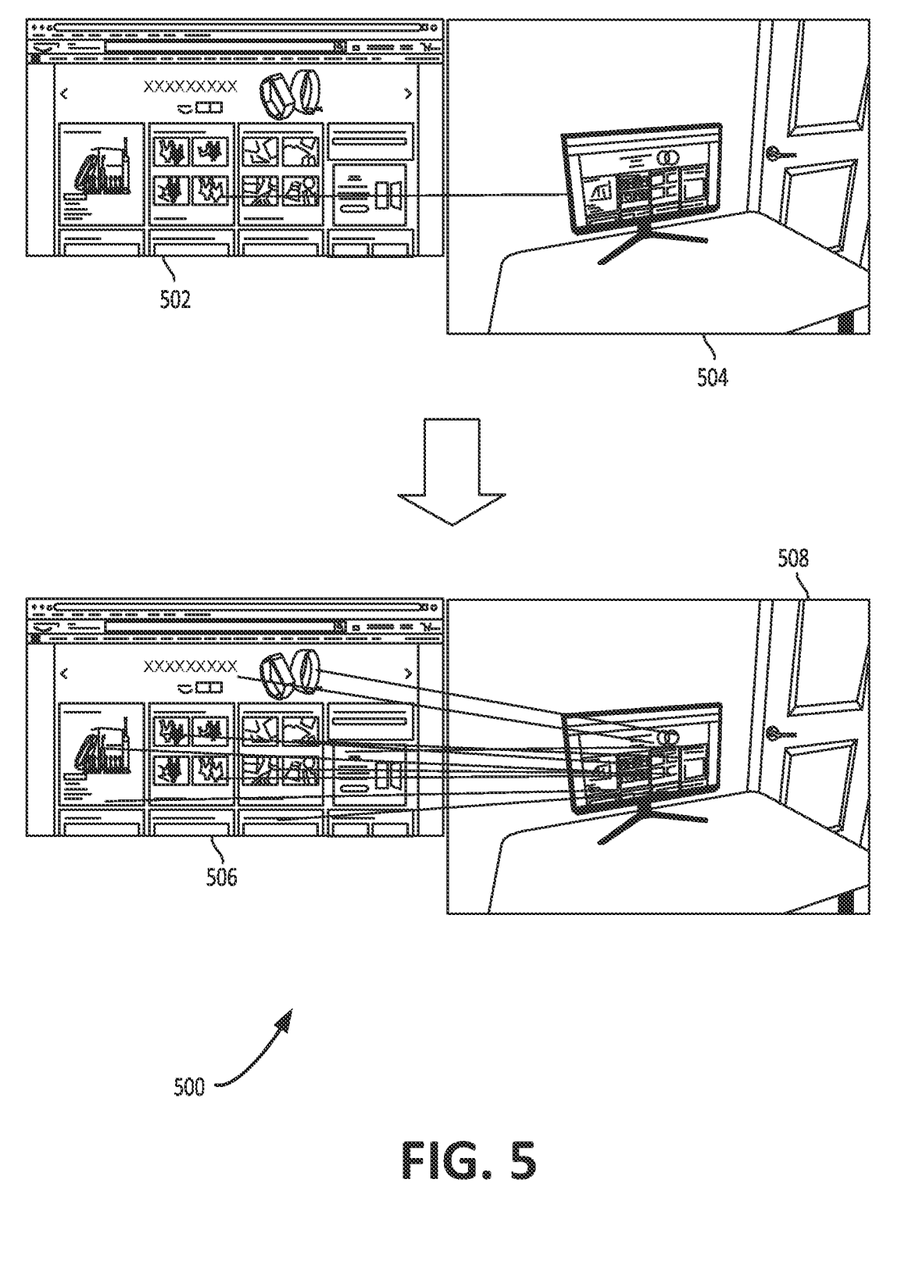
FIG. 5 is an example of feature matching resulting from use of the neural network as trained for feature detection according to certain embodiments.

FIG. 5 is an example 500 of feature matching resulting from use of the neural network as trained for feature detection according to certain embodiments. In the upper part of the figure, point-to-point matching is carried out with an off-the-shelf graph neural network with no training. The network matches local features by finding correspondences and rejecting non-matchable points. Assignments are estimated by solving a differentiable transport problem with the value of a cost function being predicted by the neural network. In example 500, only one matching pair is generated based on template image 502 and content image 504, which has been captured using a mobile computing device.

After the matching above is carried out, a convolutional neural network is trained and combined with a graph neural network as previously described. Training can be carried out using a dataset that includes target images that are used to establish ground truths. Matching is then carried out to produce matching pairs based on template image 506 and content image 508. Many more matching pairs are generated. The number of coarse matching pairs generated using the trained model can easily exceed what is shown in FIG. 5, which has been simplified for clarity.

Figure 6:
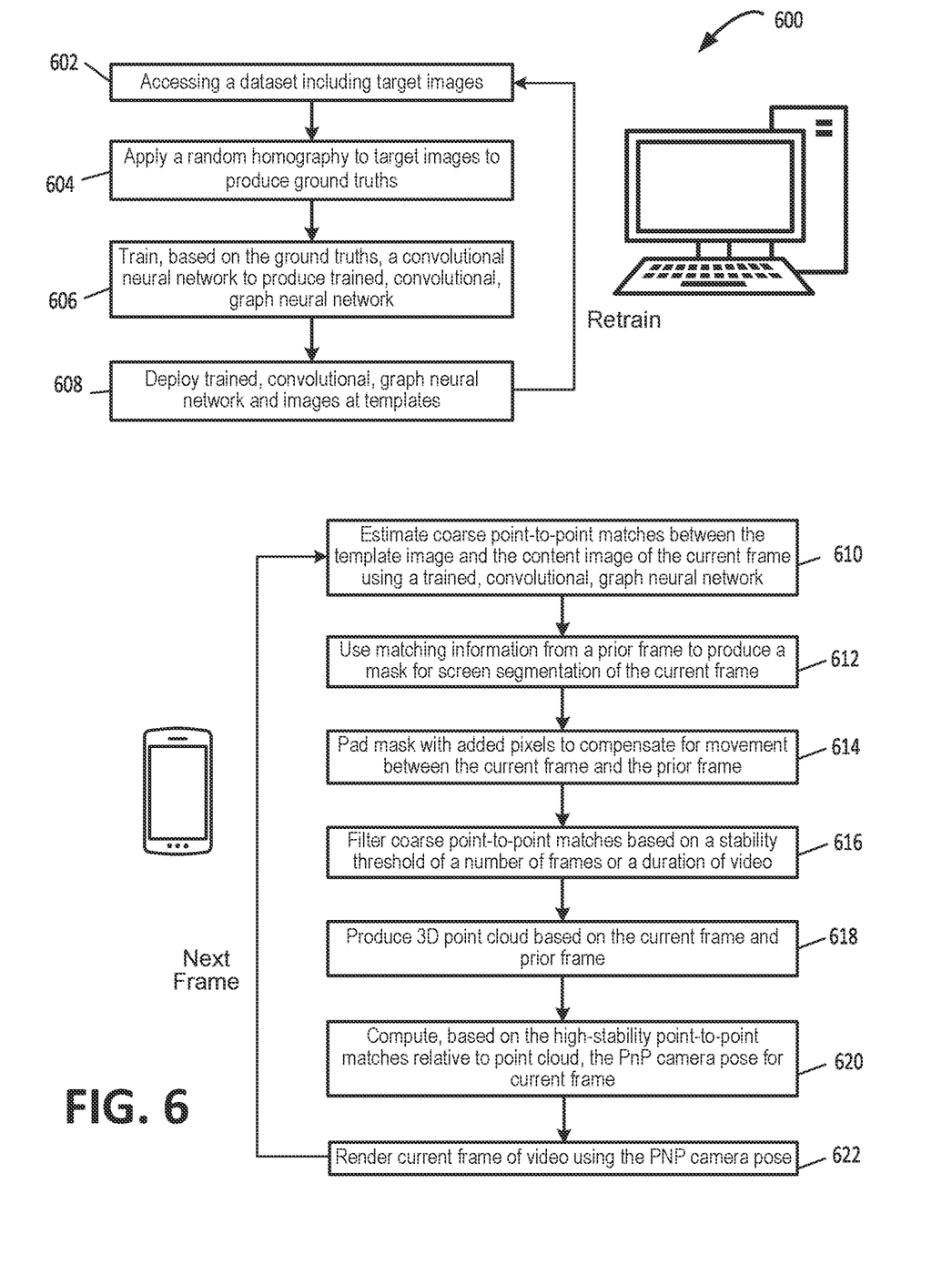
FIG. 6 is another flowchart of another example of a process for uses feature detection for AR according to some embodiments.

FIG. 6 is another flowchart of another example of a process 600 for feature detection for AR according to some embodiments. In this example, one or more computing devices carry out the process by executing suitable program code. More specifically, blocks 602 through 608 include training and/or retraining a convolutional neural network to produce a trained convolutional graph neural network that is used to estimate course point-to-point matches. These blocks may be executed by a, for example, computing device 146, which may be a workstation or similar computing device used for model training, image curation, and application deployment.

At block 602, the computing device accesses a data set including target images, for example from a website. At block 604, the computing device applies a random homography to the target images to produce ground truths. A publicly available dataset of web pages can provide target images for training. In one example, a dataset with approximately 8500 web pages can be used. A homography is the planar projection of an image. For training the model in this example, random homographies can be applied to images in order to produce the ground truths. Image size can be reduced for training. For example, 480×640 versions of images can be used. Some images can be reserved for validation. For example, 80% of the images can be used for training, with 20% being held out for validation.

At block 606 in FIG. 6, the computing device trains, based on the ground truths, the convolutional neural network to produce the trained convolutional, graph neural network for use in estimating course point-to-point feature matches. At block 608 the trained model is deployed, for example, as part of an update for an application that is deployed to end-user computing devices such as smartphones or tablets.

Blocks 610 through 622 in this example are carried out repeatedly on a computing device such as computing device 101 by executing suitable program code, for example, computer program code for an application, such as AR application 102. These operations are carried out with the trained model last deployed, for example, as part of an application or application update for a mobile computing device. At block 610, the computing device estimates course point-to-point matches between the template image and the content image of the current frame using a trained, convolutional, graph neural network, in a manner similar to that of block 304 of FIG. 3. At block 612, the computing device uses matching information from a prior frame to produce s mask for screen segmentation of the current frame, for example, to segment region of interest 406 from the rest of the frame displayed on the screen of display device 404 in FIG. 4. At block 614, the computing device pads the mask with added pixels to compensate for movement between the current frame and the prior frame.

Some existing matching techniques can produce feature points on the background area of an image, which may not be part of the region of interest. Some of these algorithms further limit the total number of feature points for matching to a fixed number to reduce runtime demands, causing the number of points in the region of interest to be diluted due to the feature points in the background of the image. This dilution can decrease the number of available matches for use in calculating the camera pose and affect the quality of pose estimation. In order to solve this problem by eliminating undesired feature points detected in background areas when an image is displayed on a monitor for training, the monitor screen is first extracted from its surroundings, so that the working feature points are all located on the screen itself. The matching information from a previous frame is used to build a mask for screen segmentation. The mask is padded with additional pixels to compensate for movement between frames. This approach uses existing information from matches and has a minimal effect on runtime.

At block 616, the computing device filters the course point-to-point matches based on a stability threshold. An example algorithm for stable point-to-point match filtering is:

Input: a threshold $\delta$, a m × n matrix S contains m matches across n frames,
   a 1 × m zero matrix C stores counting for every matches
Output: a 1 × N stable matching mapping C
for j ← 1 to n do                                ▹Loop through frames
   C ← C + $S_{*,j}$ Add match count to C, $S_{*,j}$ is the match occurrence for j frame. * means for all the matches at a given frame.
end for
C[C ≤ $\delta$] ← 0        ▹Set the mapping matrix to preserve stable matches
return C The functions included in block 610 through block 616 and discussed with respect to FIG. 6 can be used in implementing a step for producing, using a trained, convolutional, graph neural network, high-stability point-to-point matches between a template image and a content image for the current frame of video.

At block 618, the computing device produces a three-dimensional (3D) point cloud based on the current frame and the prior frame. At block 620, the computing device computes, based on the values of the high stability point-to-point matches relative to the point cloud, the PnP camera pose for the current frame. At block 622 the computing device renders the current frame of video using the camera pose. Processing proceeds back to block 610 to process the next frame in the video stream.

The stability threshold can be used in these examples to address issues resulting from some of the matches from the neural network being unstable due to the blurring of frames caused by movement and vibration of the camera. These unstable matches can show up and disappear across consecutive frames, significantly decreasing pose estimation accuracy. To address this issue, the stability threshold causes the algorithm to record matches in frames from a first few seconds of video. High-stability matches can be defined at least in part by the stability threshold.

In one example, stable matches can be defined based on whether a given feature match is constant across some number of frames greater than the stability threshold d. Let S denote a matrix that encodes whether a match i is presented in a frame or not. More formally:

$$S_{i,j} = \begin{cases} 1 & \text{if match exists} \\ 0 & \text{else} \end{cases}.$$

Further, the mapping matrix C can be used to define the stability for match i:

$$C_i = \begin{cases} 1 & \text{if stable match} \\ 0 & \text{else} \end{cases}.$$

S and C can be used to extract stable matches for a frame. The match occurrence for the first n frames in matrix S is added to a zero matrix C to count the total number of matches. An unstable match is filtered out by $\delta$, which will set the mapping of a specific match to zero if the number of occurrences varies over a time period of frame count that is less than $\delta$. The threshold for a given feature match in this example is a number of frames or a duration of video over which the point-to-point match persists. The output is a stable matching mapping C, which can be used to extract the stable matches in following frames. Assuming matrix M contains matching information of a frame for rendering, the stable matches $M_{stable}$ can be extracted by:

$$M_{stable} = M \wedge C,$$

where $\wedge$ is the logical "and" operator.

The high stability matches $M_{stable}$ can be used to solve PnP pose computation for pose estimation. In one example, the threshold δ is set to the number of frames (n) for first few seconds. Increasing the time too much will dramatically affect the total number of available matches for pose estimation since not every match is guaranteed to have 100% occurrence in every frame. As one example, the time can be first set to four seconds (240 frames at 60 fps) for finding stable matches empirically. Such a time period is long enough to find stable matches and short enough so as not to affect the number of available matches. In various embodiments, a stability threshold from two to six seconds can work for 60 fps video, or a stability threshold of from 120 to 360 frames of video can be effective at any frame rate.

Figure 7:
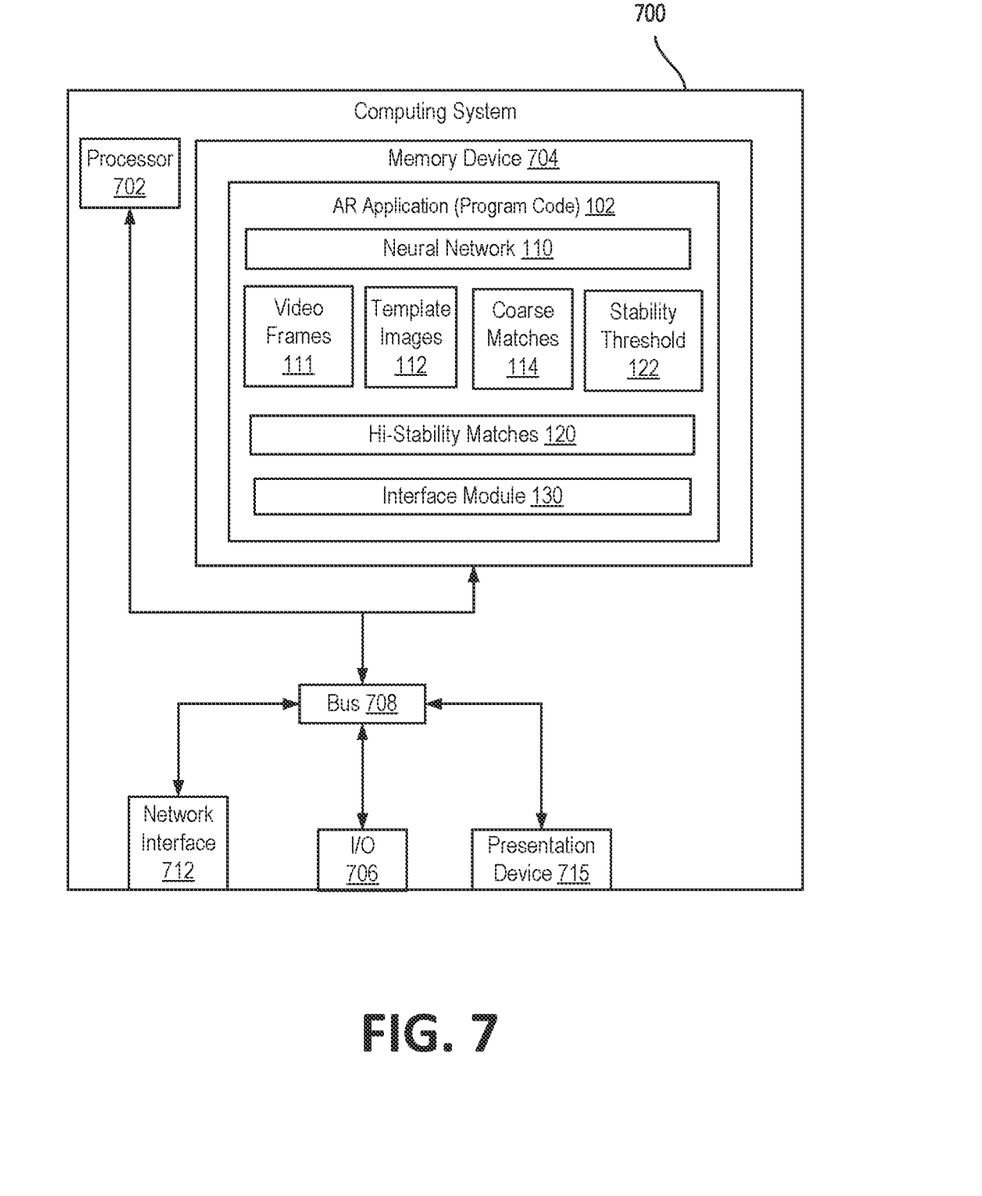
FIG. 7 is a diagram of an example of a computing system that can AR camera tracking using feature detection according to certain embodiments.

FIG. 7 is a diagram of an example of a computing system that can AR camera tracking using robust feature detection according to certain embodiments. System 700 includes a processing device 702 communicatively coupled to one or more memory devices. The processing device 702 executes computer-executable program code stored in the memory component 704. Examples of the processing device 702 include a microprocessor, an application-specific integrated circuit ("ASIC"), a field-programmable gate array ("FPGA"), or any other suitable processing device. The processing device 702 can include any number of processing devices, including a single processing device. The memory component 704 includes any suitable non-transitory computer-readable medium for storing data, program code instructions, or both. A computer-readable medium can include any electronic, optical, magnetic, or other storage device capable of providing a processor with computer-readable, executable instructions or other program code. The memory component can include multiple memory devices to provide a computer-readable medium. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C #, Visual Basic, Java, Python, Perl, JavaScript, and ActionScript.

Still referring to FIG. 7, the computing system 700 may also include a number of external or internal devices, for example, input or output devices. For example, the computing system 700 is shown with one or more input/output ("I/O") interfaces 706. An I/O interface 706 can receive input from input devices or provide output to output devices (not shown). Output may be provided using the interface module 130 of the AR application 102. One or more buses 708 are also included in the computing system 700. The bus 708 communicatively couples one or more components of a respective one of the computing system 700. The processing device 702 executes program code that configures the computing system 700 to perform one or more of the operations described herein. The program code includes, for example, AR application 102 or other suitable applications that perform one or more operations described herein. The program code may be resident in the memory component 704 or any suitable computer-readable medium and may be executed by the processing device 702 or any other suitable processor. Memory component 704, during operation of the computing system, can store the coarse, point-to-point feature matches 114, the high stability matches 120, the video frames 111, and the template images 112. Memory component 704 is also used to store trained neural network 110 and the value of the stability threshold 122.

The system 700 of FIG. 7 also includes a network interface device 712. The network interface device 712 includes any device or group of devices suitable for establishing a wired or wireless data connection to one or more data networks. Non-limiting examples of the network interface device 712 include an Ethernet network adapter, a wireless network adapter, and/or the like. The system 700 is able to communicate with one or more other computing devices (e.g., another computing device executing other software, not shown) via a data network (not shown) using the network interface device 712. Network interface device 712 can also be used to communicate with network or cloud storage used as a repository for images as well as updated or archived versions of the AR imaging application 102 for distribution and installation.

Staying with FIG. 7, in some embodiments, the computing system 700 also includes the presentation device 715. A presentation device 715 can include any device or group of devices suitable for providing visual, auditory, or other suitable sensory output. In examples, presentation device 715 displays input and/or rendered images. Non-limiting examples of the presentation device 715 include a touchscreen, a monitor, a separate mobile computing device, etc. In some aspects, the presentation device 715 can include a remote client-computing device that communicates with the computing system 700 using one or more data networks. System 700 may be implemented as a unitary computing device, for example, a notebook or mobile computer. Alternatively, as an example, the various devices included in system 700 may be distributed and interconnected by interfaces or a network with a central or main computing device including one or more processors.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "determining," and "identifying" or the like refer to actions or processes of a computing device, such as one or more computers or a similar electronic computing device or devices that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general-purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "configured to" or "based on" herein is meant as open and inclusive language that does not foreclose devices adapted to or configured to perform additional tasks or steps. The endpoints of ranges as well as comparative limits are intended to encompass the notion of quality. Thus, expressions such as "less than" should be interpreted to mean "less than or equal to" and a range such as "from x to y" should be interpreted as "greater than or equal to x and less than or equal to y."

Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques including but not limited to conventional techniques for inter-process communications, and different pairs of processes may use different techniques, or the same pair of processes may use different techniques at different times. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation and does not preclude inclusion of such modifications, variations, and/or additions to the present subject matter as would be readily apparent to one of ordinary skill in the art.

What is claimed is:

1. A method comprising:
   accessing a current frame of a captured video as well as a template image captured from a document, monitor, or web site, the template image including a digital visual object or element to be included in an augmented reality (AR) video stream, wherein the digital visual object or element includes at least one of an available item in a specific environment or a graphically generated object;
   estimating coarse point-to-point feature matches between the template image and the current frame of the captured video using a trained, convolutional, graph neural network;
   filtering the coarse point-to-point feature matches based on a stability threshold to produce high-stability point-to-point matches;
   computing, based on the high-stability point-to-point matches, a perspective-n-point (PnP) camera pose for the current frame of the captured video including the digital visual object or element; and
   rendering, as part of the AR video stream, the current frame of the captured video with the digital visual object or element using the PnP camera pose.

2. The method of claim 1, wherein the stability threshold for a point-to-point match of the coarse point-to-point feature matches comprises a number of frames or a duration of the captured video over which the point-to-point match persists.

3. The method of claim 1, further comprising:
   using matching information from a prior frame of the captured video to produce a mask for screen segmentation of the current frame of the captured video; and
   padding the mask with added pixels to compensate for movement between the current frame of the captured video and the prior frame of the captured video.

4. The method of claim 3, wherein computing the PnP camera pose further comprises:
   producing a three-dimensional point cloud based on the current frame and the prior frame of the captured video; and
   determining the PnP camera pose relative to the three-dimensional point cloud.

5. The method of claim 1, wherein estimating the coarse point-to-point feature matches further comprises determining a feature point location and a descriptor for each coarse point-to-point feature match using the trained, convolutional, graph neural network.

6. The method of claim 1, further comprising:
   accessing a dataset including web site images, the web site images further including the template image;
   applying a random homography to each of the web site images in the dataset to produce a ground truth for each of the web site images; and
   training a convolutional neural network based on the ground truth for each of web site images to produce the trained, convolutional, graph neural network.

7. The method of claim 6, further comprising deploying the trained, convolutional, graph neural network and the template image to an end-user computing device.

8. A system comprising:
   a memory component; and
   a processing device coupled to the memory component, the processing device to perform operations comprising:
   accessing a current frame of a captured video as well as a template image captured from a document, monitor, or web site, the template image including a digital visual object or element to be included in an augmented reality (AR) video stream, wherein the digital visual object or element includes at least one of an available item in a specific environment or a graphically generated object;
   estimating, using a trained, convolutional, graph neural network, coarse point-to-point feature matches between the template image and the current frame of the captured video;
   filtering the coarse point-to-point feature matches based on a stability threshold to produce high-stability point-to-point matches;
   computing, based on the high-stability point-to-point matches, a perspective-n-point (PnP) camera pose for the current frame of the captured video including the digital visual object or element; and rendering, as part of the AR video stream, the current frame of the captured video with the digital visual object or element using the PnP camera pose.

9. The system of claim 8, wherein the stability threshold for a point-to-point match of the coarse point-to-point feature matches comprises a number of frames or a duration of the captured video over which the point-to-point match persists.

10. The system of claim 9, wherein the operations further comprise:
using matching information from a prior frame of the captured video to produce a mask for screen segmentation of a current frame of the captured video; and
padding the mask with added pixels to compensate for movement between the current frame of the captured video and the prior frame of the captured video.

11. The system of claim 9, wherein computing the PnP camera pose further comprises:
producing a three-dimensional point cloud based on a current frame video and a prior frame of the captured video; and
determining the PnP camera pose relative to the three-dimensional point cloud.

12. The system of claim 8, wherein estimating the coarse point-to-point feature matches further comprises determining a feature point location and a descriptor for each coarse point-to-point feature match using the trained, convolutional, graph neural network.

13. The system of claim 8, wherein the operations further comprise:
accessing a dataset including web site images, the web site images further including the template image;
applying a random homography to each of the web site images in the dataset to produce a ground truth for each of the web site images; and
training a convolutional neural network based on the ground truth for each of web site images to produce the trained, convolutional, graph neural network.

14. The system of claim 13, wherein the operations further comprise deploying the trained, convolutional, graph neural network and the template image to an end-user computing device.

15. A non-transitory computer-readable medium storing executable instructions, which when executed by a processing device, cause the processing device to perform operations comprising:
accessing a current frame of a captured video as well as a template image captured from a document, monitor, or web site, the template image including a digital visual object or element to be included in an augmented reality (AR) video stream, wherein the digital visual object or element includes at least one of an available item in a specific environment or a graphically generated object;
a step for producing, using a trained, convolutional, graph neural network, high-stability point-to-point matches between the template image and the current frame of the captured video;
computing, based on the high-stability point-to-point matches, a perspective-n-point (PnP) camera pose for the current frame of the captured video including the digital visual object or element; and
rendering, as part of the AR video stream, the current frame of the captured video with the digital visual object or element using the PnP camera pose.

16. The non-transitory computer-readable medium of claim 15, wherein the high-stability point-to-point matches are defined in part by a stability threshold comprising a number of frames or a duration of the captured video over which a point-to-point match persists.

17. The non-transitory computer-readable medium of claim 16, wherein the operations further comprise:
using matching information from a prior frame of the captured video to produce a mask for screen segmentation of the current frame of the captured video; and
padding the mask with added pixels to compensate for movement between the current frame of the captured video and the prior frame of the captured video.

18. The non-transitory computer-readable medium of claim 16, wherein computing the PnP camera pose further comprises:
producing a three-dimensional point cloud based on the current frame and a prior frame of the captured video; and
determining the PnP camera pose relative to the three-dimensional point cloud.

19. The non-transitory computer-readable medium of claim 15, wherein the operations further comprise:
accessing a dataset including web site images, the web site images further including the template image;
applying a random homography to each of the web site images in the dataset to produce a ground truth for each of the web site images; and
training a convolutional neural network based on the ground truth for each of web site images to produce the trained, convolutional, graph neural network.

20. The non-transitory computer-readable medium of claim 19, wherein the operations further comprise deploying the trained, convolutional, graph neural network and the template image to an end-user computing device.

* * * * *